United States Patent
Thorne

(10) Patent No.: US 7,873,476 B2
(45) Date of Patent: Jan. 18, 2011

(54) WELL LOG CORRELATION

(75) Inventor: Julian Thorne, Orange, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 436 days.

(21) Appl. No.: 12/166,840

(22) Filed: Jul. 2, 2008

(65) Prior Publication Data

US 2010/0004864 A1   Jan. 7, 2010

(51) Int. Cl.
*G01V 1/40* (2006.01)
(52) U.S. Cl. .......................................... 702/6
(58) Field of Classification Search ............. 702/6–13
See application file for complete search history.

(56) References Cited

U.S. PATENT DOCUMENTS

| 6,832,159 B2 * | 12/2004 | Smits et al. ............. 702/11 |
| 7,280,932 B2 | 10/2007 | Zoraster |
| 2004/0064257 A1 | 4/2004 | Tobias et al. |
| 2006/0256657 A1 | 11/2006 | Robinson |
| 2007/0156377 A1 | 7/2007 | Gurpinar et al. |
| 2007/0260403 A1 | 11/2007 | Wood |

* cited by examiner

*Primary Examiner*—Drew A Dunn
*Assistant Examiner*—Stephen J Cherry
(74) *Attorney, Agent, or Firm*—Carlos L. Hanze

(57) ABSTRACT

A method of automatically correlating well logs includes selecting well loops from the well logs and creating a set of possible marker positions for each well log in each well loop. From the possible marker positions, alternate marker sets are iteratively selected. A well tie error on each loop is calculated for each selected marker set, summed over all loops and minimized.

14 Claims, 3 Drawing Sheets

WELL LOG CORRELATION

BACKGROUND

1. Field of the Invention

The present invention relates generally to processing of geological data and more particularly to correlation of identified features between well logs.

2. Description of the Related Art

Well log correlation can provide useful information regarding subsurface geology. For example, by matching features between well logs, an accurate interpolation may be made for intervening subsurface regions. Where individual layers may be correlated across several wells, it may be possible to determine something about the depositional environment and/or sequence stratigraphic interpretation of the subsurface region, which may, in turn, provide information regarding the location or accessibility of hydrocarbon resources.

Historically, expert analysis has been used to correlate features between well logs, relying on time-consuming manual review and interpretation of numerous images. As machine vision and pattern recognition have developed into mature technologies, computer methods have been developed for using pattern recognition to automatically correlate features between wells. In general, these methods are restricted to well-to-well correlation for pairs of wells, without an ability to solve field-wide correlation problems.

SUMMARY

Aspects of embodiments of the present invention provide a method of automatically correlating a plurality of well logs representing information relating to geology of a subsurface region, including, selecting a plurality of well loops from the plurality of well logs, creating a set of possible marker positions for each well log in each well loop, iteratively selecting, from the possible marker positions, alternate marker sets between well pairs, calculating a well tie error on each loop for each selected marker set, summing, over all well loops, the calculated well tie error, minimizing the summed well tie error, and correlating the subsurface geology between wells using the sets of marker positions and the well tie error.

In an embodiment, the method further includes selecting the set of marker sets for which the summed loop tie error is minimized.

Aspects of embodiments of the invention provide a system for performing the foregoing method.

Aspects of embodiments of the invention may include a computer-readable medium encoded with computer-executable instructions for performing the foregoing method or for controlling the foregoing system.

Aspects of embodiments of the invention may include a system incorporating the foregoing system and configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In a given region of an exploration area, there may be a large number of wells drilled. Some wells are drilled with the hope that they will be production wells, others are for fluid injection, or for testing purposes. During, or after, drilling of each well, one or more well logs may be produced, measuring properties of the subsurface formations through which they are drilled.

By way of example, resistivity and gamma ray logs may be taken to provide analysts with information that they can interpret in order to determine information about conditions in the subsurface region. Gamma ray logs, for example, may be used in assigning facies classifications to layers of subsurface material, allowing experts to identify permeable layers such as sand that may help to indicate locations where hydrocarbon resources are likely to be found.

Figure 1:
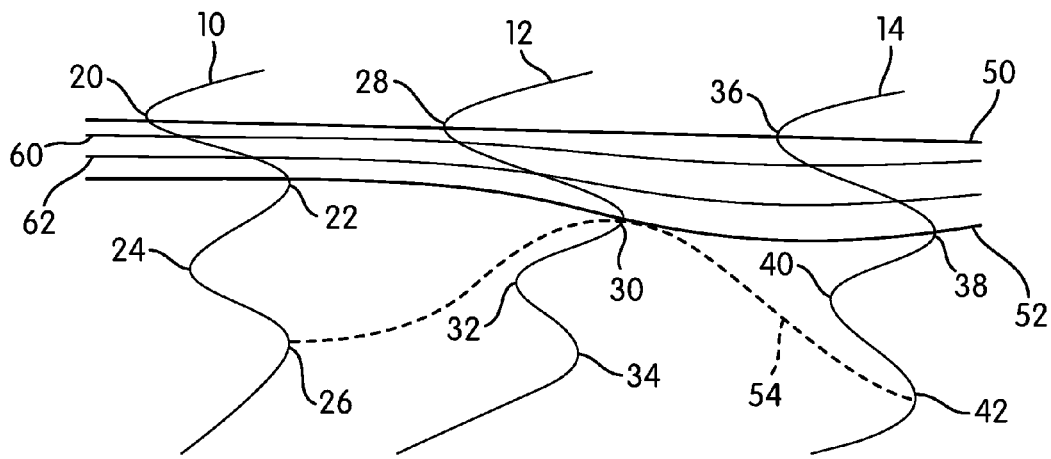
FIG. 1 illustrates a region including three well logs to be tied in accordance with an embodiment of the present invention.

FIG. 1 schematically illustrates three well logs 10, 12, 14 representing properties of the subsurface formation, derived from, e.g., amplitude of a signal from a logging tool from three different wells. In each log, there are maxima and minima, representing changes in sign of the derivative of the amplitude of the logging tool signal. Note that these schematic traces are far more regular and smooth than a typical real-world trace would be.

For the purposes of this example, assume that the logs represent a normalized $V_{sh}$, or volume of shale as a percentage of the rock at that point of the log. Because $V_{sh}$ is well correlated to permeability, it can be considered to be generally correlated to connectivity between subsurface regions.

As illustrated, well log 10 includes $V_{sh}$ minima and maxima 20, 22, 24, 26, while well log 12 includes corresponding minima and maxima 28, 30, 32, 34 and well log 14 includes corresponding minima and maxima 36, 38, 40 and 42. As can be seen, in this simplified situation, the first minimum 20 of log 10 corresponds quite clearly to the first minimum 28 of log 12. Likewise, the first minimum 36 of log 14 corresponds to the other two first minima, 20, 28. Likewise, there appear to be matching maxima, 22, 30, 38. In a simplified case like that shown in FIG. 1, it is trivial to determine that these sets of minima and maxima correspond to an abrupt change in a common property of the subsurface formation, and therefore most likely correspond to a layer boundary.

In this regard, a thick line 50 can be drawn through the minima 20, 28, 36, to indicate a first layer boundary. Likewise, a thick line 52 may be drawn through the maxima 22, 30, 38 to indicate a second layer boundary. Note that the maxima 30, 38 are lower along the respective logs 12, 14 than is the maximum 22 along log 10, indicating (assuming that the well logs have been normalized for depth) that these points lie deeper below the surface than does the maximum 22. That is, the layer boundary indicated by the thick line 52 is deeper at the wells logged by logs 12 and 14 than it is at the well logged by log 10.

The resulting lines 50, 52, along with additional lines that could be drawn through the minima 24, 32, 40 and maxima 26, 34, 42, may be thought of as user performed well log correlation. That is, distinctive markers from adjacent logs (in this case, maxima and minima of $V_{sh}$ of adjacent logs) are correlated to determine a layer structure of the subsurface region.

While it may appear obvious that the above selected correlations are correct for the simple well logs shown in FIG. 1, alternate possibilities for interpretation are available. For example, rather than correlating maxima 26, 34, 42, dashed line 54 may be drawn between maxima 26, 30, 42. As will be appreciated, real-world traces are significantly less regular, and over a region of interest, there will be significantly more maxima and minima that may or may not represent common layer boundaries.

As shown in the FIG. 1, two (or any number of) additional stratigraphic grid lines 60, 62 may be included between the boundaries indicated by thick lines 50, 52.

While FIG. 1 illustrates an exceptionally smooth curve, a real-world curve is likely to have a much more ragged profile. As a result, the number of peaks and troughs is large, and potential correlation picks become numerous as well. One solution to this issue is to provide a degree of smoothing to the curve prior to attempting log correlation. This will reduce the number of potential markers, and therefore computing time required to perform the method.

The degree of smoothing can depend in part on the thickness of the interval to be correlated. Where the interval is extremely thick, a greater deal of smoothing may be desirable, while a thin interval can allow for relatively less filtering of the data to be processed.

In an embodiment, a method of well correlation begins by selecting a reference well. In general, the reference well may be selected such that it is relatively central to the group of wells under study. Moreover, it may be useful to select a well that includes a relatively thick section in the zone of interest and which has a log signature that is typical of the stratigraphic cycles over the interval.

In the reference well log, a top and base of a zone of interest are defined. Additionally, markers may be selected to correspond to the top and/or the bottom of the zone. The markers may or may not exactly indicate the top and bottom of the zone, but may instead be near the zone boundaries.

Where there is additional information available regarding the geological structure of the region under study, a preferred loop orientation may be included as a constraint on the correlation between well logs. Where, for example, depositional environment is known, and that depositional environment provides insight as to how adjacent wells are likely to be connected, that information can be included as a factor in the automatic correlation.

For example, in a near-shore environment, the direction of the shoreline provides information regarding likely trends in basin structure and indicates a strong influence of directionality on well connectivity. On the other hand, far from known structures there may be very little known regarding directionality, and this factor can be given little, or no weight, as desired.

Figure 2:
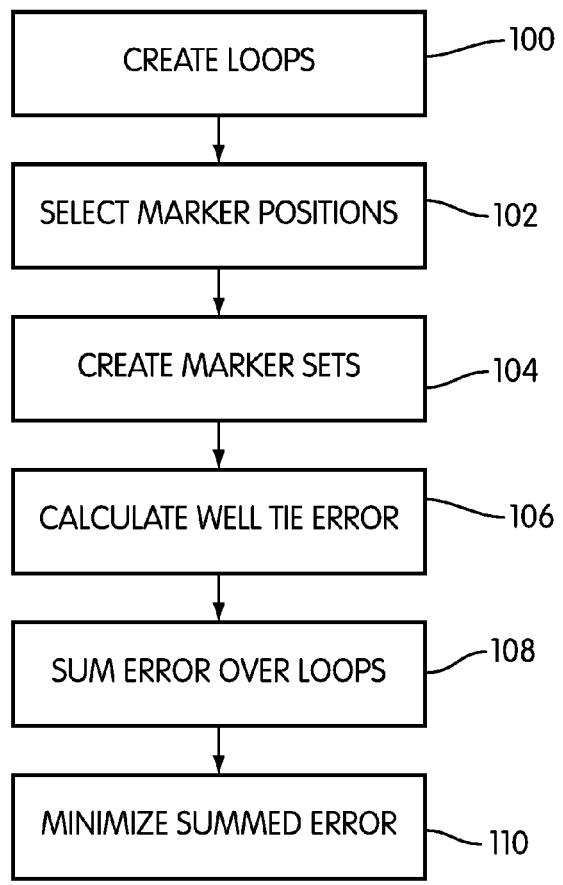
FIG. 2 is a flow chart illustrating a method in accordance with an embodiment of the present invention.

In view of the foregoing, a method for automatically correlating well logs is illustrated by the flow chart of FIG. 2.

From the set of logs under investigation, a number of loops are constructed 100, each loop connecting three near to each other logs. As described above, known directionality of the underlying geological environment can optionally be used to influence the determination of which wells are considered to be neighbors to each other. Note that while the example describes loops of three, the principles described herein apply equally to loops of varying size.

For each log, a set of possible marker positions is selected 102. By way of example, markers may be peaks of the well logs (either maxima or minima, or both) though other markers may be used. For example, rather than selecting individual peaks, particular groups or patterns of peaks may be used. From the possible marker positions, alternate marker sets are selected 104 tying adjacent logs together. For each loop, a well tie error is calculated 106 for the each selected marker set. The calculated well tie error is summed 108 over all well loops. Finally, the summed loop tie error is minimized 110.

Figure 3:
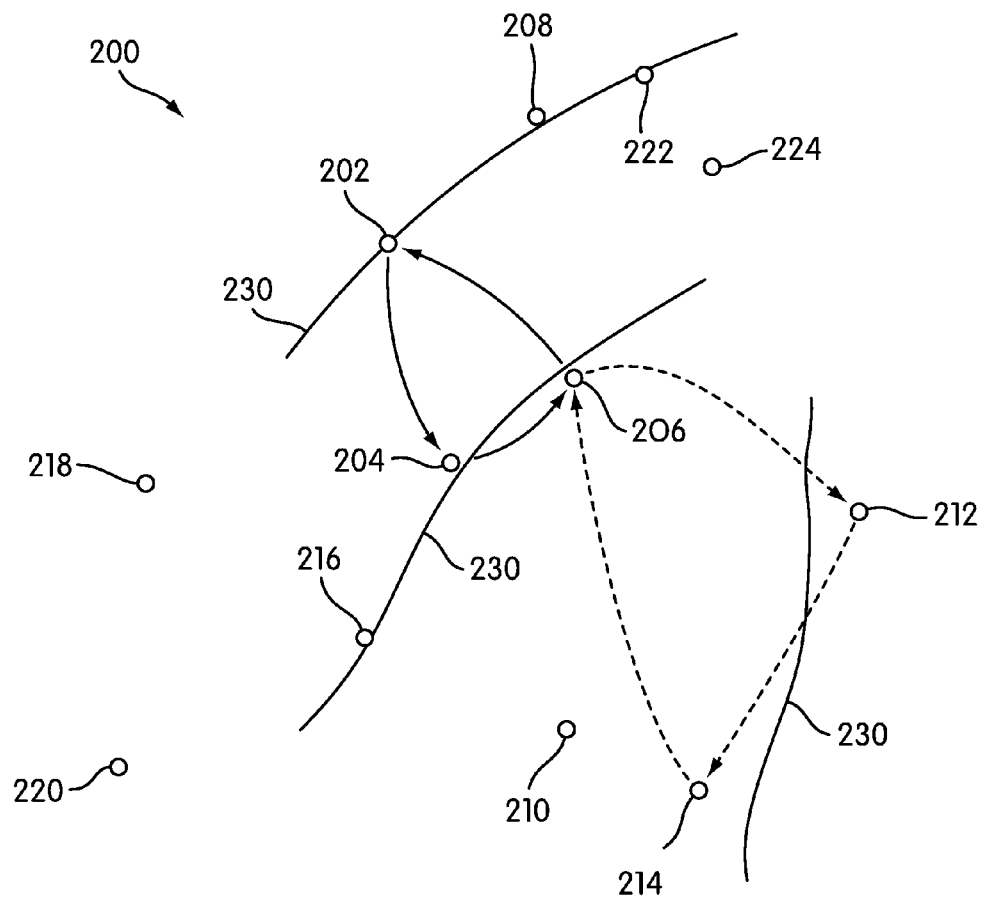
FIG. 3 schematically illustrates a well field having a number of wells to be tied.

The above process is explained in greater detail with reference to FIG. 3. FIG. 3 schematically illustrates a field 200 that includes twelve wells 202-224, each having a respective log curve. Three lines 230 indicate a general trend of connectivity within the field, generally extending from the northeast to the southwest corners of the field. As noted above, such a pattern of connectivity may be deduced from pre-knowledge of the depositional environment or other geological history of the basin in which the field sits.

First, a particular one of the wells 202 is selected as the reference well. Starting at 202, a loop, shown as solid arrows, is constructed from 202 to 204, from 204 to 206 and from 206 to 202. Note that the directionality of the loop (in this case counter clockwise) is important, as, in general, the method will produce different results when tying from 204 to 206 than when tying from 206 to 204, for example.

Similar triangular loops can be generated tying other wells together, and tying loops together. By way of example, a second loop indicated by dashed arrows is shown connecting 206 to 212, proceeding to 214 and returning to 206. Note that ties for this loop can be internally calculated, and the use of 206 in both the solid and dashed loops provides for the possibility of global tying over all 5 wells. By extension of this approach to all of the wells in the field, the entire field may be tied in accordance with the method. As noted above, triangular loops are described in this example, but other groupings of wells can equally be created and used in accordance with the method.

Marker ties are generated between wells within a loop, for example extending from log peak to log peak, in accordance with a variable picking strategy. A number of iterations are performed, with the picking strategy changing from iteration to iteration. Each time a set of marker ties is selected, that set is stored, for example in a list that can be stored in the memory of a computer.

The picking strategy is based on a matching score that is calculated for the log curve using variable parameters so that varying marker ties are created. As an example, the similarity of the log curve can be calculated over a window size that varies, and the picking strategy can be defined in terms of weights applied to each applied window size. In an embodiment, with varying window size, different smoothing is applied to the curve. In particular, a greater degree of smoothing can be applied to larger windows.

In proceeding around the loop, the picking strategy is allowed to change from well to well. The constraints on this function can be, for example, parameters input by the user including a minimum window size, window step size, maximum window size and/or window size ratios.

Additional geological constraints can be applied in order to ensure that the results are reasonably physical. For example, if a pair of markers is correlated such that the dip between them exceeds a threshold amount (for example, a local dip calculated from input top and base markers), then that pairing can be excluded. A user-adjustable maximum dip parameter that allows for greater or lesser dips can be optionally applied to change this value. Furthermore, this parameter can be normalized with respect to a wavelength of the log data as it relates to the thickness of the zone of interest.

Further, marker ties can be selected such that notional units that they define do not cross. For example, the best scoring tie can be safely added to the marker list without introducing a cross. For the second best scoring tie, it is only added to the list if it does not cross any existing (the best scoring) tie. Likewise, the third best tie is added if it does not cross the first or second best scoring ties, and so on.

Once all well pairs have been visited a threshold number of times, which may be user defined, or constant. At this point, a complete list of alternative marker ties will have been generated, and optimization can be performed.

In an embodiment, simulated annealing is used to determine which of the alternate sets of ties produces a best correlation. Other global optimization algorithms could be applied within the scope of the present method, but simulated annealing is described herein as a representative approach.

Well pairs are randomly chosen and marker ties for that pair are changed according to an annealing schedule. The loop tie error of the pair's current marker ties is determined by adding the loop tie error in each triangular loop containing that pair.

Loop tie error can be defined as a difference between starting and ending depths of a loop from well A to B to C to A. That is, where the tying from C to A ends at a point different from the point where a corresponding tie from A to B begins. This measurement can be made relative to traces that begin in well A at 100 equally spaced depths, proceed according to the current marker ties to B, thence to C and back to A.

The changes in accordance with the annealing schedule are introduced and the change is kept if it improves the loop tie error. If it does not, then that change has a random chance of being kept. The random chance may be reduced as the annealing proceeds, and the method converges on a final selection. Likewise, as the annealing proceeds, the perturbations are reduced in size, so that changes in correlation between pairs are reduced over the course of iterations. As a part of the user interface, parameters for the annealing schedule can be adjustable.

The annealing may be repeated for a number of iterations. For each iteration, the loops are ranked based on a residual mis-tie error. New marker sets are added to those loops that have the worst ties (i.e., greatest loop tie error). For example, a threshold loop tie error can be set, and all loops with a greater error have new marker sets introduced. One method of adding such new marker sets is, for a loop A-B-C, to correlate A to C using the current mis-tie set and adding marker picks between each peak in A and the nearest peak in C to the correlated positions.

Finally, markers are traced from each peak position of the reference well using the optimized marker sets. For this process, wells are sorted by distance from the reference well (optionally including directional considerations) to produce a well visit order. Moving from the reference well, the optimized marker tie set is used to correlate between a current well and a next well in the well visit order.

Table 1 illustrates an example of a series of runs of a loop tie method each run with different parameters input by the user including a minimum window size, window step size, maximum window size and maximum dip in accordance with an embodiment of the invention. The validation error is calculated from the difference between a manually-picked marker choice optionally provided by the user and the equivalent marker as automatically picked by the method.

TABLE 1

| Run | Loop Tie Error | Validation Error |
| --- | --- | --- |
| 1 | 3.94 | 8.42 |
| 2 | 6.04 | 10.27 |
| 3 | 5.34 | 9.75 |
| 4 | 7.92 | 16.3 |
| 5 | 3.79 | 12.89 |
| 6 | 4.93 | 21.29 |
| 7 | 5.33 | 16.08 |
| 8 | 7.34 | 30.21 |

In the example illustrated in Table 1, the smallest calculated loop tie error is found for run 5, while the smallest calculated validation error is found at run 1. In the case where the validation marker is known to be correct, then validation error may be used as the primary determiner, otherwise, loop tie error may be used. Likewise, it may be possible to select a minimized pair. In the example of Table 1, run 1 gives a loop tie error nearly as small as run 5, while also having the smallest validation error. As a result, run 1 may be selected as a best fit given the selected parameters.

Table 2 gives a second example, for which the optimum run is more easily selected, as both loop tie and validation errors are at a minimum for as single run, run 5

TABLE 2

| Run | Loop Tie Error | Validation Error |
| --- | --- | --- |
| 1 | 8.80 | 7.57 |
| 2 | 14.12 | 8.70 |
| 3 | 9.05 | 8.16 |
| 4 | 14.94 | 15.01 |
| 5 | 8.56 | 5.29 |
| 6 | 13.68 | 9.12 |
| 7 | 9.12 | 7.25 |
| 8 | 13.93 | 7.94 |

In an embodiment, the method may include a functionality for selecting an analogous study zone (i.e., one with similar well log characteristics) from which a workflow can be copied for application to the zone of interest. In this manner, a user may not have to select all of the relevant parameters for analysis of the area under study, but rather can take advantage of the experience from previously studied areas. As will be appreciated, such a functionality may include the ability to make changes to the copied workflow so that where the zones are not strictly analogous, adjustments can be made to compensate for that fact.

Figure 4:
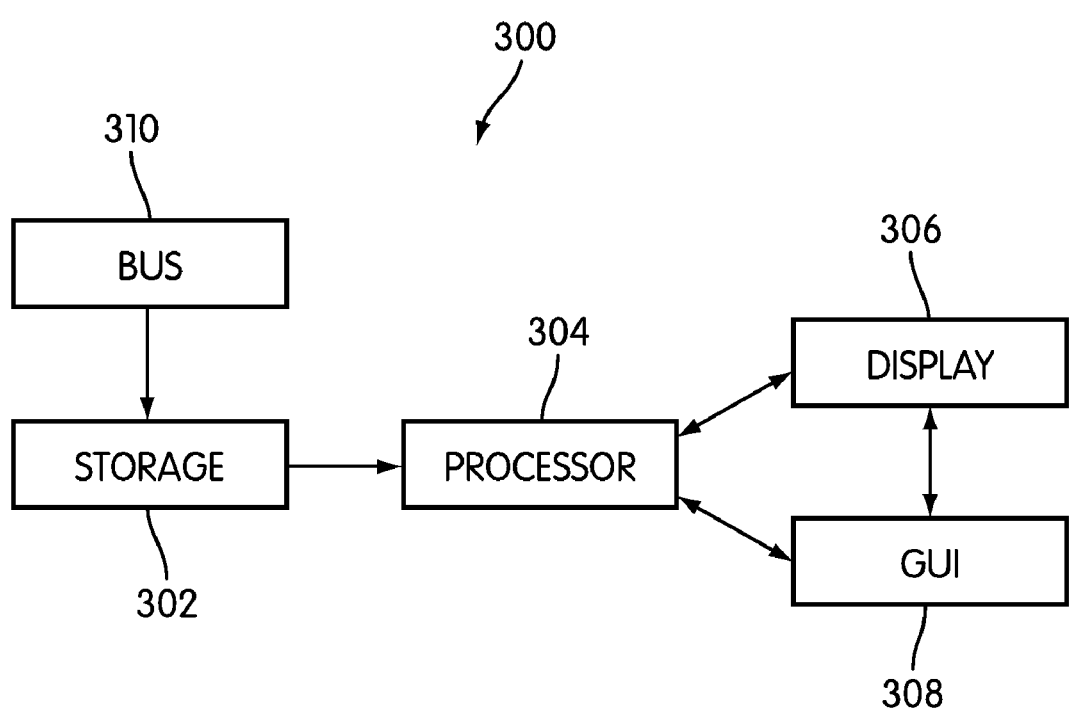
FIG. 4 is a schematic illustration of an embodiment of a system for performing methods in accordance with embodiments of the present invention.

A system for performing the method is schematically illustrated in FIG. 4. A system 300 includes a data storage device or memory 302. The stored data may be made available to a processor 304, such as a programmable general purpose computer. The processor 304 may include interface components such as a display 306 and a graphical user interface 308. The graphical user interface may be used both to display data and processed data products and to allow the user to select among options for implementing aspects of the method. Data may be transferred to the system 300 via a bus 310 either directly from a data acquisition device, or from an intermediate storage or processing facility (not shown).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of automatically correlating a plurality of well logs representing information relating to geology of a subsurface region, comprising:
    selecting a plurality of well loops from the plurality of well logs;
    creating a set of possible marker positions for each well log in each well loop;
    iteratively selecting, from the possible marker positions, alternate marker sets between well pairs;
    calculating a well tie error on each loop for each selected marker set;
    summing, over all well loops, the calculated well tie error;
    minimizing the summed well tie error; and
    correlating the geology of the subsurface region between well logs using the sets of marker positions and the summed well tie error, wherein the minimizing and the correlating steps are performed by a processor.

2. A method in accordance with claim 1, wherein the possible marker positions are created by use of an automated pattern recognition technique.

3. A method in accordance with claim 2, wherein multiple pattern recognition techniques are used to generate alternate sets of possible marker positions for each well log in each well loop.

4. A method in accordance with claim 1, wherein well logs are grouped into well loops in accordance with their proximity to one another.

5. A method in accordance with claim 1, wherein each well loop consists of three well logs.

6. A method in accordance with claim 1, wherein the minimizing comprises a global optimization method.

7. A method in accordance with claim 6, wherein the global optimization method comprises simulated annealing.

8. A method in accordance with claim 1, wherein well tie error for a loop is determined by:
    tracing a plurality of depths in a first well of the loop to subsequent wells in the loop in a loop order and from a last well of the loop back to the first well of the loop; and
    determining a difference between a starting depth in the first well and an ending depth in the first well.

9. A method in accordance with claim 1, wherein the well loops are selected such that each well loop is interconnected with at least one other well loop.

10. A system for automatically correlating a plurality of well logs representing information relating to geology of a subsurface region, comprising:
    a data storage device having computer readable data including data relating to the plurality of well logs;
    a processor, configured and arranged to execute machine executable instructions stored in a processor accessible memory for performing a method comprising:
        selecting a plurality of well loops from the plurality of well logs;
        creating a set of possible marker positions for each well log in each well loop;
        iteratively selecting, from the possible marker positions, alternate marker sets between well pairs;
        calculating a well tie error on each loop for each selected marker set;
        summing, over all well loops, the calculated well tie error;
        minimizing the summed well tie error; and
        correlating the subsurface geology between wells using the sets of marker positions and the well tie error.

11. A system as in claim 10, further comprising a user interface configured and arranged to allow a user to adjust parameters used in the iteratively selecting.

12. A system as in claim 11, wherein the user interface further is configured and arranged to display the set of marker positions for which the summed loop tie error is minimized.

13. A system as in claim 10, further comprising a user interface configured and arranged to allow a user to adjust parameters used in the creating the set of possible markers.

14. A system as in claim 10, further comprising a display, configured and arranged to display a layer structure of a subsurface region from which the well logs were taken, based, at least in part, on the correlation of the well logs.

* * * * *